United States Patent
Lin

(10) Patent No.: US 7,742,890 B2
(45) Date of Patent: Jun. 22, 2010

(54) COLD JUNCTION COMPENSATION METHOD FOR TEMPERATURE CONTROLLING CONSOLE

(75) Inventor: Ching-Yi Lin, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 791 days.

(21) Appl. No.: 11/620,448

(22) Filed: Jan. 5, 2007

(65) Prior Publication Data

US 2008/0165827 A1 Jul. 10, 2008

(51) Int. Cl.
*G01K 15/00* (2006.01)

(52) U.S. Cl. ........................................... 702/99
(58) Field of Classification Search ............... 702/99; 374/115

See application file for complete search history.

(56) References Cited

U.S. PATENT DOCUMENTS 6,425,687 B1 * 7/2002 Kulczyk ..................... 374/115

* cited by examiner

*Primary Examiner*—Tung S Lau
*Assistant Examiner*—Xiuquin Sun
(74) *Attorney, Agent, or Firm*—Chun-Ming Shih

(57) ABSTRACT

A compensation method for cold junction of temperature controlling console is used to compensate the temperature difference of cold junctions when a plurality of temperature controlling consoles are connected in series, where one temperature controlling console is master temperature controlling console and others are slave temperature controlling consoles. Each of the consoles has a serial input end, a serial output end and a master/slave communication end, where the serial output end of one slave console is connected to the serial input end of next slave console to form serial connection. The master/slave communication ends of all consoles are connected parallel. When the master temperature controlling console at end of the series sends a communication protocol data to all slave consoles, the slave consoles set their communication protocol to judge the positions thereof and then set the temperature compensation according to their position and their built-in program for cold junctions.

2 Claims, 3 Drawing Sheets

COLD JUNCTION COMPENSATION METHOD FOR TEMPERATURE CONTROLLING CONSOLE

BACKGROUND OF THE INVENTION

1. Field of the Invention

The present invention relates to a linking of a plurality of consoles, especially to a linking method of consoles, which judges the arrangement order of consoles for the reference of temperature control.

2. Description of Prior Art

In current automatic control system, heat is inevitably generated and excessive heat will influence normal operation of equipment. Therefore, temperature-controlling console is provided for those equipments, which monitors the operation status of equipments to ensure normal operation of the equipments.

As to the temperature-controlling apparatus, it generally measures temperature by thermal couple. However, cold junction compensation is necessary for the measurement of the thermal couple, because the measurement of the thermal couple has deviation in actual environment. Afterward, a DC output will be generated. In general, the temperature for the cold junction compensation is room temperature for temperature-controlling apparatus in single-unit operation and thermal stability condition, whereby the actual temperature can be measured.

In current control scheme for equipment, a plurality of temperature-controlling consoles are necessary to meet the requirement of different manufacture conditions. The temperature for the cold junction compensation is room temperature for temperature-controlling apparatus in single-unit operation. However, heat is inevitably generated and cold junction compensation temperature has error as the internal temperature of the temperature-controlling console is increased. The correctness of the temperature measurement is influenced.

To overcome this erroneous condition, the program for the cold junction compensation takes the internal temperature increment into account to reduce error. However, when the number of the temperature-controlling consoles in series is more than 3, the center temperature-controlling console is also influenced by two adjacent temperature-controlling consoles, besides the internal temperature increment thereof. Therefore, the center temperature-controlling console has larger internal temperature increment. Measurement error is inevitable if the program of the cold junction compensation does not consider this factor. It is research issue to overcome the data error for more than one temperature-controlling consoles.

SUMMARY OF THE INVENTION

The present invention is to provide a cold junction compensation method for temperature controlling console, which provides cold junction temperature compensation according to arrangement order of the consoles. The consoles can set up communication protocol and judge their arrangement order by one-time communication protocol transfer. The consoles can select their own cold junction temperature compensation scheme according to the arrangement order to reduce temperature measurement error during their serial connection operation.

Accordingly, the present invention provides a cold junction compensation method for temperature controlling console. Each of the consoles comprises a master/slave communication end, a serial input end, and a serial output end. The serial output end of one console electrically connected to the serial input end of console of next stage and the master/slave communication ends of all console are electrically connected in parallel to form a console series. A master console at the last stage sends a communication protocol data to all slave consoles through the master/slave communication ends and then the slave consoles perform communication protocol setting and judge the arrangement order thereof. The slave consoles then perform temperature compensation program according to the arrangement order to reduce temperature measurement error.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
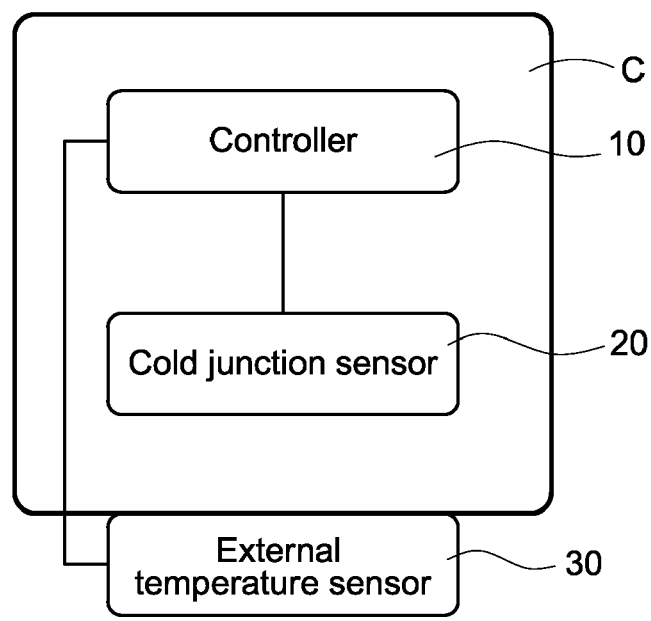
FIG. 1 shows the block diagram of the temperature-controlling console of the present invention.

FIG. 1 shows the block diagram of the temperature-controlling console of the present invention. The temperature-controlling console C of the present invention uses thermo-electrical effect for temperature measurement. It is well known and the detailed description is omitted here. The temperature-controlling console C of the present invention comprises a controller 10, a cold junction sensor 20 and an external temperature sensor 30. The cold junction sensor 20 and the external temperature sensor 30 are electrically connected to the controller 10. The controller 10 receives temperature data measured by the cold junction sensor 20 and the external temperature sensor 30 and performs cold junction compensation according to the temperature data measured by the cold junction sensor 20 and the external temperature sensor 30.

Therefore, when the temperature-controlling console C is in single-unit operation, the temperature-controlling console C has only heat from internal components thereof. Provided that the cold junction sensor 20 senses a temperature data of Ts, the cold junction sensor 20 senses a temperature data of Tj, the temperature due to internal component heat dissipation is Tc1, the normal temperature of the cold junction is Tj=Ts−Tc1. The controller 10 can correct error according to the temperature data Tj and the built-in compensation program for cold junction temperature thereof.

Figure 2:
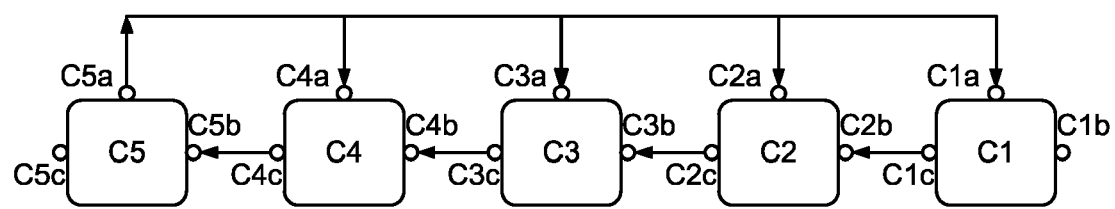
FIG. 2 shows the block diagram for the connection of the temperature-controlling consoles C of the present invention.

FIG. 2 shows the block diagram for the connection of the temperature-controlling consoles C of the present invention, which is exemplified with five temperature-controlling consoles C. Namely; there are one master console C5 and four slave consoles C1-C4. However, the number of slave temperature-controlling consoles can be changed according to practical requirement. The consoles C1-C5 can be of the same type of console. Each of the consoles C1-C5 comprises a master/slave communication end (C1a~C5a), a serial input end (C1b~C5b), and a serial output end (C1c~C5c). The master/slave communication ends C1a~C4a of the slave consoles C1-C4 are electrically connected to the master/slave communication ends C5a of the master console C1. The serial output end (C1c~C4c) of the slave consoles C1-C4 are electrically connected to the serial input end (C2b~C5b) of consoles C2-C5 of next stage. For example, the serial output end C3c of the third slave console C3 is electrically connected to the serial input end C4b of the fourth console C4. The serial output end C4c of the fourth slave console C4 is electrically connected to the serial input end C5b of the master console C5. The serial output end C5c of the master console C5 and the serial input end C1b of the first slave console C1 are idle (not connected).

Taking a system with N consoles as example, the master console has label CN, and the slave consoles have lave labels C1~C(N−1). The master/slave communication end (C1a~CNa) are connected in parallel. The serial output end CMc of one console is electrically connected to the serial input end C(M+1)b of next-stage console, where 1≦M≦N. Moreover, the serial output end CNc of the master console CN and the serial input end C1b of the first console C1 are idle (not connected). In this serial-connection system, the console with idle serial input end is assigned as the first console C1. Therefore, any console can judge whether it is the first console C1 in the system by checking the connection status of the serial input end. The master console is at the last stage. Namely, the console with idle serial output end is assigned as master console.

Figure 3:
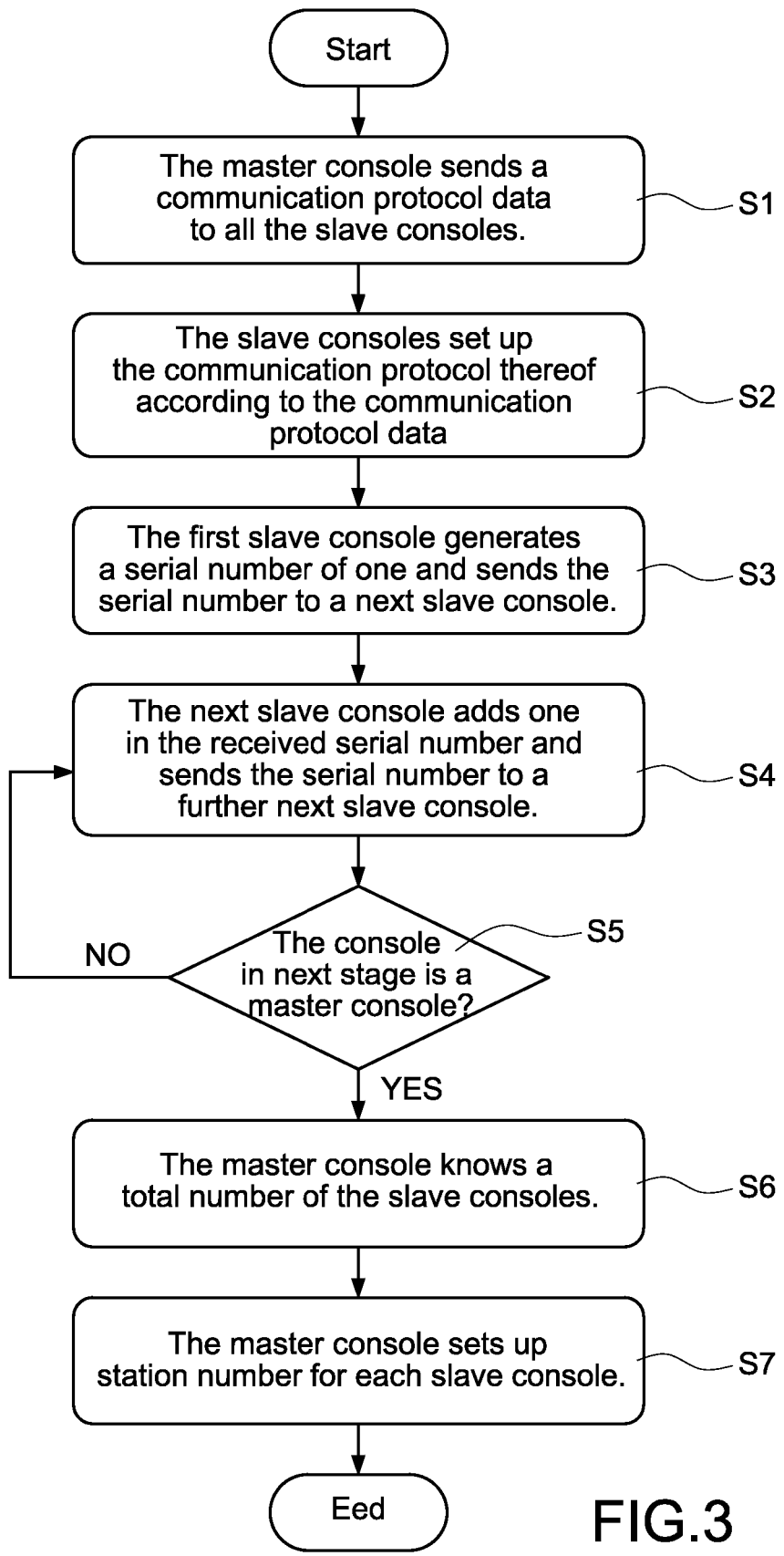
FIG. 3 shows the flowchart of automatic linking method of the present invention.

FIG. 3 shows the flowchart of the linking method of the present invention, which is used to link a plurality of consoles. In step S1, an operator or a software program sends a communication protocol data from the master/slave communication ends C5a of the master console C5 to the master/slave communication end (C1a~C4a) of the slave consoles C1-C4. In step S2, the slave consoles C1-C4 set up their own communication protocol according to the communication protocol data. In step S3, the first slave console C1 with idle serial input end generates a serial data of one and then sends the serial data to the serial input end C2b of the next console (the second console) through the serial output end C1c thereof. In step S4, the second console C2 receives the serial data and adds one to the serial data, and then sends the updated serial data to next stage console. Step S5 judges whether the next console is the master console. If false, the next console is still slave console and step S4 is repeated again. Otherwise, step S6 is performed. In step S6, the master console identifies the total number of the slave consoles. In step S7, the master console sets up the station numbers for the slave consoles C1-C4 through the master/slave communication ends (C1a~C5a). Therefore, the setting task of communication protocol and station number for all slave consoles can be completed.

Figure 4:
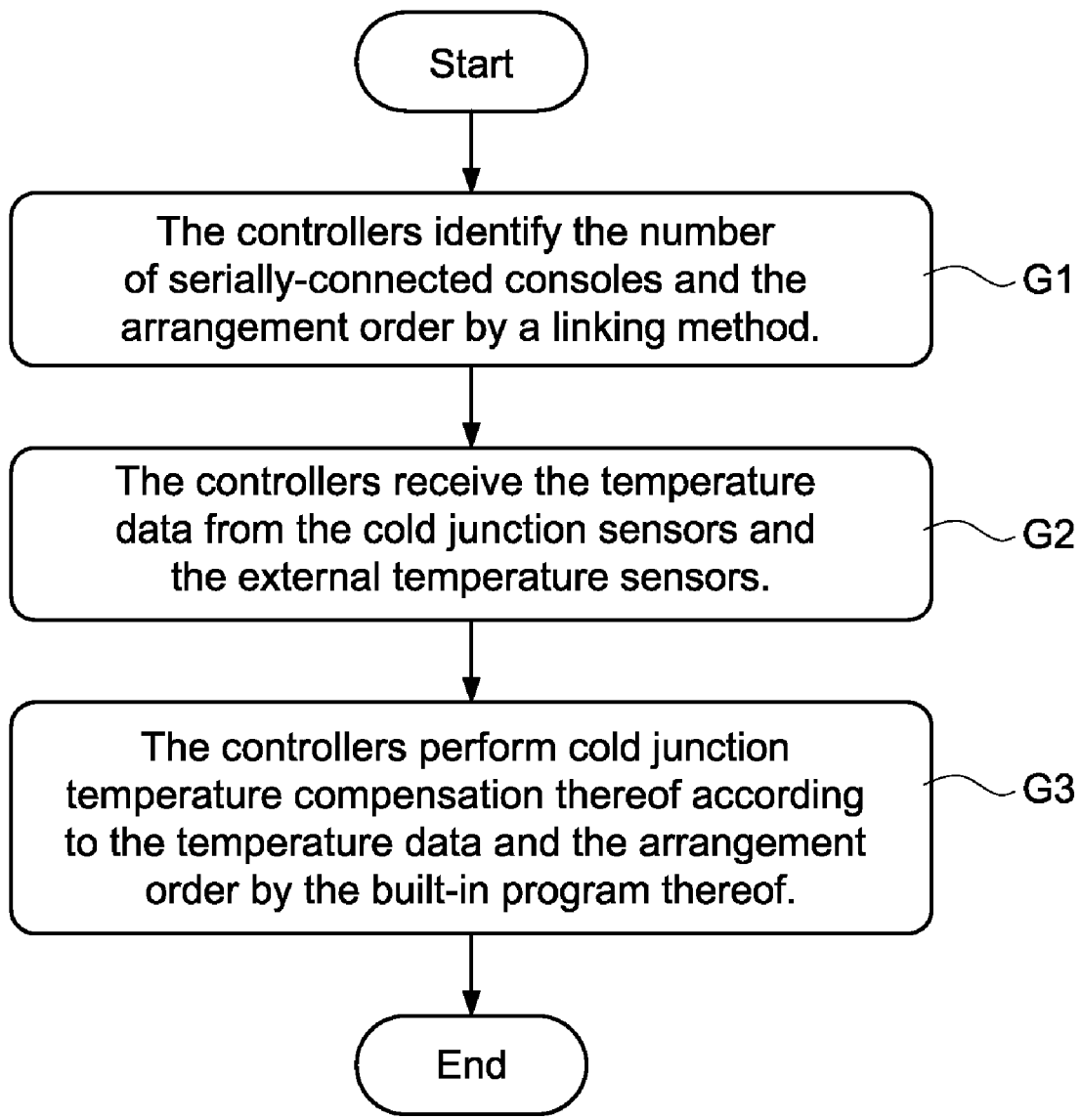
FIG. 4 shows the flowchart of temperature compensation method of the present invention.

FIG. 4 shows the flowchart of temperature compensation method of the present invention. After the connection of the consoles C1-C5, the controllers 10 in consoles C1-C5 can identify the number of serially-connected consoles and the arrangement order in step G1 by the linking method of the present invention. The controller 10 then receives the temperature data from the cold junction sensor 20 and the external temperature sensor 30 in step G2. Afterward, the controllers 10 in consoles C1-C5 perform cold junction temperature compensation thereof according to the temperature data and the arrangement order thereof by the built-in program thereof in step G3. Taking the same example of five consoles, the consoles C1-C5 can identify the arrangement order thereof and adjacent consoles. For example, the consoles C1 and C5 are electrically connected.

In thermal equilibrium condition, there is a temperature difference Tm besides the temperature Tj measured by the external temperature sensor 30, the heat Tc1 generated by internal components of the temperature-controlling console C, and the temperature data Ts of the cold junction sensor 20. The temperature difference Tm is loaded into the built-in program of the controller 10 before the controller 10 performs temperature compensation. Therefore, the cold junction temperature for the temperature-controlling consoles C1 and C5 are Tj=Ts−Tc2−Tm. The controller 10 performs temperature compensation according to the cold junction temperature. The temperature-controlling consoles C2, C3 and C4 have two adjacent consoles Therefore, they have the same thermal impact under thermal equilibrium condition. The cold junction temperature for the temperature-controlling consoles C2, C3 and C4 are Tj=Ts−Tc2−2Tm. Afterward, the controllers 10 in the e temperature-controlling consoles C2, C3 and C4 perform temperature compensation according to the cold junction temperature.

Although the present invention has been described with reference to the preferred embodiment thereof, it will be understood that the invention is not limited to the details thereof Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A compensation method for cold junction of temperature-controlling console, the temperature-controlling console comprising a controller, a cold junction sensor and an external temperature sensor, where the cold junction sensor and the external temperature sensor are electrically connected to the controller, the method comprising the steps of:

a) the controller identifying the number of connected consoles and an arrangement order of the consoles by a linking process;

b) the controller receiving temperature data from the cold junction sensor and the external temperature sensor;

c) the controller performing temperature compensation for cold junction according to the temperature data and the arrangement order;

wherein each of the consoles comprises a master/slave communication end, a serial input end, and a serial output end, the serial output end of one console electrically connected to the serial input end of console of next stage and the master/slave communication ends of all console being electrically connected in parallel to form a console series, the console at one end of the console series being a master temperature-controlling console and others being slave temperature-controlling consoles, the console at another end of the console series being a first slave temperature-controlling console, the method comprising the steps of:

d) the master console sending a communication protocol data to all the slave consoles;

e) the slave consoles setting up the communication protocol thereof according to the communication protocol data;

f) the first slave console generating a serial number of one and sending the serial number to a next slave console;

g) the next slave console adding one in the received serial number and sending the serial number to a further next slave console;

h) repeating step d);

i) when the master console receives the serial number from a slave console connected thereto, the master console sets a total number of the slave consoles equal to the received serial number; and j) the master console setting up station number for each slave console through the master/slave communication end.

2. The compensation method for cold junction of temperature-controlling console as in claim 1, wherein the step j) comprises following steps:

j1) the master console adding a station number P thereof with a serial number Q sent from a previous-stage slave console and then adding one thereto and then sending a sum (P+Q+1) to each slave console;

j2) each of the slave console subtracting a serial number M thereof from the sum (P+Q+1) to obtain a difference (P+Q+1−M) as the station number thereof.

* * * * *